United States Patent [19]
Diaz

[11] Patent Number: 4,656,715

[45] Date of Patent: Apr. 14, 1987

[54] TRANSMISSION CLUTCH HOUSING REMOVAL TOOL SET

[76] Inventor: Eusebio M. Diaz, 6450 Balboa Blvd., Van Nuys, Calif. 91406

[21] Appl. No.: 884,438

[22] Filed: Jul. 11, 1986

[51] Int. Cl.⁴ .............................................. B23P 19/04
[52] U.S. Cl. ........................................................ 29/259
[58] Field of Search ................. 29/259, 260, 261, 262, 29/263, 265

[56] References Cited

U.S. PATENT DOCUMENTS

| | | | |
|---|---|---|---|
| 2,623,276 | 12/1952 | Anderson | 29/265 |
| 2,755,540 | 7/1956 | Crozier | 29/265 |
| 2,992,478 | 7/1961 | Baker | 29/259 |
| 3,055,093 | 9/1962 | Ruble | 29/265 |
| 3,163,928 | 1/1965 | Shafer | 29/259 |
| 4,077,103 | 3/1978 | Kelley | 29/259 |

*Primary Examiner*—Robert C. Watson
*Attorney, Agent, or Firm*—Albert O. Cota

[57] ABSTRACT

A tool set designed to facilitate the removal or installation of a clutch housing from the transmission case of a vehicle automatic transmission. The tool set consists of a first assembly and a second assembly. The first assembly is used to remove or replace the clutch housing from a GMC Turbo Hydramatic transmission series 325 or the like. This first assembly, consists of a tubular housing (20) that is inserted into a register on the front of the clutch housing. Once inserted, the housing (20) is tightened against the register by expanding the end of the housing with an expansion sleeve (26) located within the tubular housing (20). The sleeve (26) expands when it is pulled inwardly by the rotation of a compression means (48). The clutch housing is removed by applying pressure to a threaded shaft (50) that pushes against the transmission output shaft and release the clutch housing. The second assembly is used in combination with the first assembly to hold and center the output shaft at the rear of the transmission case during the removal of the clutch housing from a GMC series 200 transmission or the like. The second assembly consists of a body (56) having a recessed threaded hole in the middle and a plurality of legs (58) distending downwardly. Each leg has a headed screw (10) that allows the body (56) to be attached to the transmission case. A threaded shank screw (62) is located in the hole on the body (560). When rotated, the screw (62) contacts a dimple on the end of the shaft and holds the shaft securely in place.

7 Claims, 13 Drawing Figures

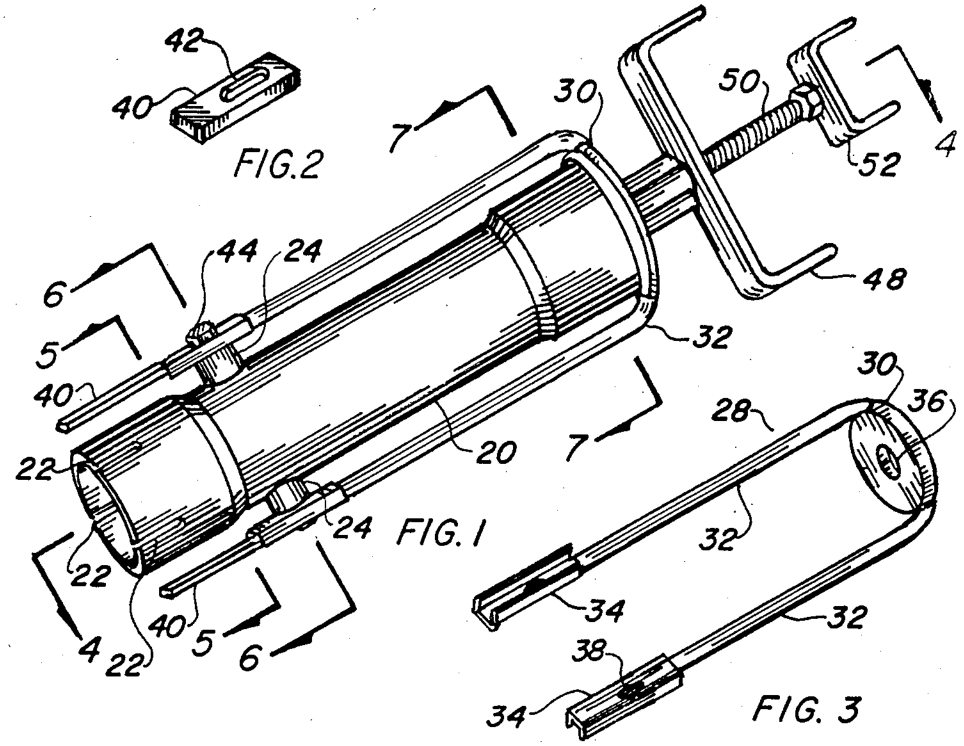
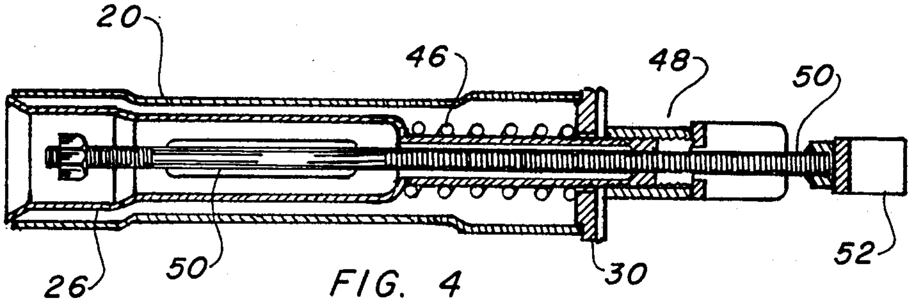
FIG. 4
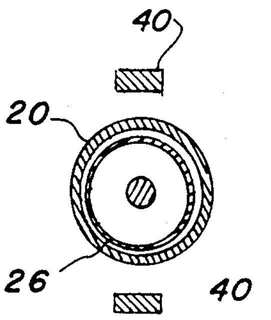
FIG. 5
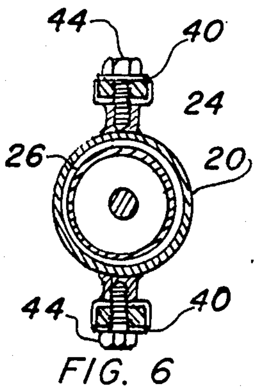
FIG. 6
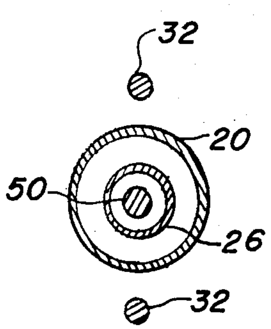
FIG. 7

TRANSMISSION CLUTCH HOUSING REMOVAL TOOL SET

TECHNICAL FIELD

The present invention relates to assembly and disassembly tools in general, and more specifically to a tool for removing the clutch housing from the transmission case of a General Motors Turbo Hydramatic Model 200 and 325 automatic transmission.

BACKGROUND ART

Previously, many types of tools have been used endeavoring to assist the mechanic in rebuilding an automatic transmission. Specific hand tools are in common use for a given application, with many available from the original manufacturer of the automobile or transmission. Simple hand tools have also been utilized, however, some assemblies within an automatic transmission require holding both ends of a split shaft and the gripping of a surface not specifically made to receive tools in order to expedite disassembly procedures beyond the factory suggested method. A search of prior art did not disclose any patents that read directly on the claims of the instant invention, however, the following U.S. patents were considered related:

| Pat. No. | Inventor | Issue Date |
|---|---|---|
| 4,077,103 | Kelley | Mar. 7, 1978 |
| 3,163,928 | Shafer | Jan. 5, 1965 |
| 2,992,478 | Baker | Jul. 18, 1961 |
| 2,697,273 | Clarke et al | Dec. 21, 1954 |
| 1,473,811 | Cantrell et al | Nov. 13, 1923 |
| 1,346,868 | Wilson | Jul. 20, 1920 |

Kelley teaches a pulling tool for removing a shaft from a hub on a fan or blower. The tool has a screw for seating against one end of the shaft and a nut threaded on the screw with four screws engaging the hub of the blower wheel at 90 degree intervals. Further, gripping means are four hook-like fingers that grip the skirt on one end and grasp the hub of a propeller fan on the other. These fingers are rotated out of the way into spring clips when not in use.

Shafer is concerned with pulling a hub from an axle of a motor vehicle. This invention utilizes the principle of direct force application to the inside surface of the wheel flange with the reaction being placed against a backing plate. The clamping force is accomplished by the tool having a "C" shaped portion on each end of a flat strap slipping over a flange and a wing bolt in the center.

Baker again is pulling the axle from a wheel flange in an automobile. This is accomplished by the use of a bridging member having a serrated surface on the underside and slots through which securing bolts extend. Baker in most cases uses the movable hook bracket over the flange with a rotating member in the center.

Clarke et al utilizes a pulling device to which they have combined a jack screw with a slide hammer for inertial energy. The device has the adaptability to change heads to incorporate different sizes and configuration of work pieces.

Cantrell et al are concerned with a specific sleeve or a bushing on a shaft having an aperture for the reception of such a tool.

For background purposes and as indicative of the art to which the invention relates, reference may be made to the remaining cited patents.

It will be noted that prior art is aware of specific problems of configuration and particular structural differences in the elements being removed. Further, while various approaches were made to the problem, the basic compression in the center against clamping on the outside of the removable piece were in evidence, but not on both ends of a split shaft nor on the inside register of a pulley or gear.

DISCLOSURE OF THE INVENTION

While prior art has looked toward different and varied approaches to pull elements apart, the fact remains that specific mechanical embodiments require specialized tools unique to the situation that contain all of the structural capabilities necessary for the application.

This invention is no exception, as the primary object of the invention is to provide a tool set that facilitates the removal and replacement of the clutch housing from the transmission case of an automatic transmission. The tool set is comprised of a first assembly and a second assembly. The first assembly is used to remove and replace the clutch housing from a General Motors Corporation (GMC) Turbo Hydramatic transmission series 325 or the like. The first assembly is also used in combination with the second assembly to remove a GMC Turbo Hydramatic transmission series 200 or the like.

The clutch housing in all cases, is comprised of an assemblage of several integrated components. Because of the housing complexity, size and its position within the transmission case, it is difficult to remove without a tool that can be easily manipulated to allow the housing to be grabbed and extracted from the case. Currently there are tools available for assisting transmission specialists to remove the clutch housing. However, their use is not expedient and approaches the undertaking in an entirely different manner. The biggest problem is finding a clutch housing surface upon which to grip and also the holding and centering of the output shaft, while so manipulating the housing. It is, therefore, another object of the invention to provide a tool that solidly and easily grips the inside register of the clutch housing with an expanding tool that allows the clutch housing to be dislodged from the transmission case.

An important object of the invention also allows the clutch housing to be dislodged from an automatic transmission case without the need for additional hand tools and while the case is situated on a work bench.

In another object, the tool provides the proper clearance between the clutches to allow the front output shaft snap-ring to be easily installed or removed while the transmission case and housing are situated on a work bench.

The tool set also allows the rear planetary gear, clutch housing, clutch plates, front planetary gear, and other integrated components to be assembled on the output shaft and locked in place with a snap-ring to form a complete low and reverse gear assembly.

An important object of the invention is also the time savings involved, which in some cases may be up to two hours of labor on the total disassembly and reassembly of the automatic transmission.

Still another object of the invention allows the entire clutch housing to be handled as a complete assembly, rather than necessitating individual component manipulation.

Yet another object provides a reliable, small, portable and easy to store tool that is within the economic ability of most mechanics to purchase. The tool incorporates these features with a configuration that is also easy and simple to manufacture using material that is readily available and utilizes conventional threaded stock and simple machined components.

These and other objects and advantages of the present invention will become apparent from the subsequent detailed description of the preferred embodiment and the appended claims taken in conjunction with the accompanying drawings.

BRIEF DESCRIPTION OF THE DRAWINGS

FIG. 1 is a partial isometric view of the tool set first assembly.

FIG. 2 is a partial isometric view of one of the positioning bars completely removed from the invention for clarity.

FIG. 3 is a partial isometric view of the bifurcated yoke completely removed from the first assembly.

FIG. 4 is a cross-sectional view taken along lines 4—4 of FIG. 1.

FIG. 5 is a cross-sectional view taken along lines 5—5 of FIG. 1.

FIG. 6 is a cross-sectional view taken along lines 6—6 of FIG. 1.

FIG. 7 is a cross-sectional view taken along lines 7—7 of FIG. 1.

BEST MODE FOR CARRYING OUT THE INVENTION

Figure 8:
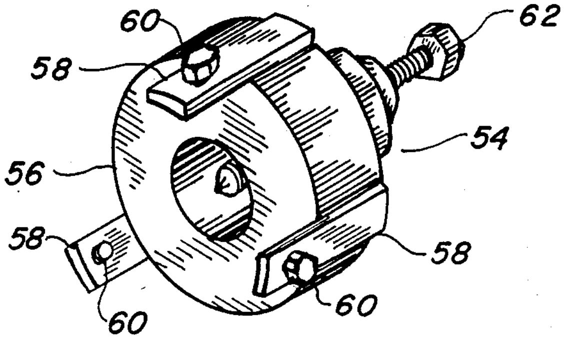
FIG. 8 is a partial isometric view of the transmission shaft forcing means of the second assembly.
Figure 9:
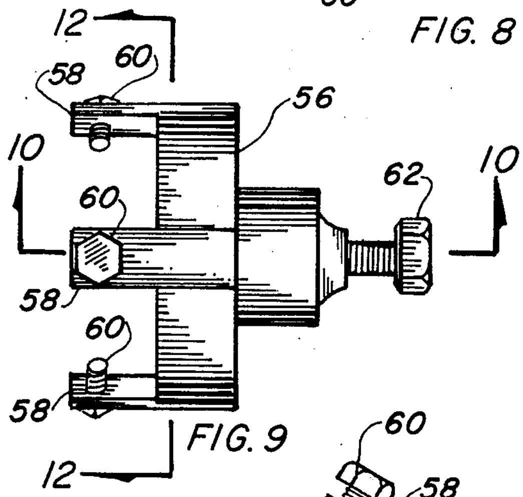
FIG. 9 is a side elevational view of the second assembly.
Figure 10:
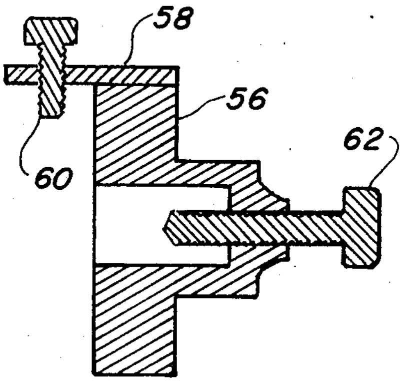
FIG. 10 is a cross-sectional view taken along lines 10—10 of FIG. 9.
Figure 11:
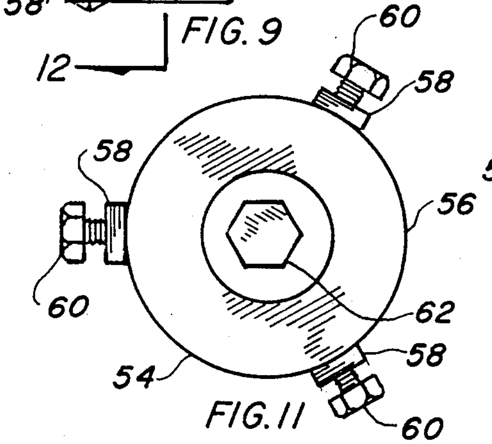
FIG. 11 is a plan view of the second assembly.
Figure 12:
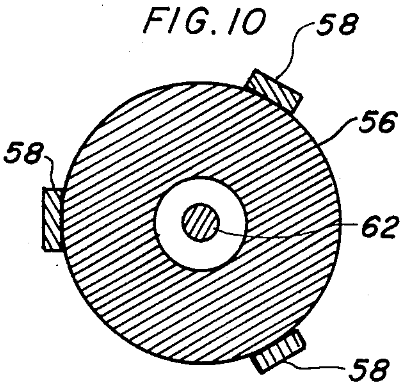
FIG. 12 is a cross-sectional view taken along lines 12—12 of FIG. 8.

The best mode for carrying out the invention is presented in terms of a preferred embodiment. The preferred embodiment, as shown in FIGS. 1 through 12, is comprised of two major assemblies, each separate from the other. The first assembly is used singularly to remove or replace the clutch housing from a GMC Turbo Hydramatic transmission series 325 or the like and in combination with the second assembly to remove and replace the clutch housing from a transmission series 200 or the like.

The first assembly, which is installed on the front end of the output shaft, is formed of a tubular housing 20 having a first and second end, with a middle portion somewhat smaller in diameter than the ends. The first end contains a plurality of slots 22 allowing the end to be expanded to a larger diameter. A pair of opposed internally threaded bosses are positioned near the first end, each connected integrally with the housing 20 in a directly opposite manner. The housing 20 is made of metal, preferably steel, and has a relatively thin wall which allows a slight belling effect on the slotted end, and yet, is not permanently deformed.

An expansion sleeve 26 is inserted within this housing 20 and has the first end belled outward to a diameter slightly larger than that of the housing. This shape allows diametrical expansion to take place when the sleeve 26 is forced into the housing 20 with the slots 22 permitting the requisite radial expansion to be accomplished. The second end of the sleeve 26 is reduced in diameter, forming a hollow rod with both the outside and inside diameter threaded.

A bifurcated yoke 28 having a top disk 30 and a pair of downwardly extending legs 32 is shown in FIG. 3. This yoke has a channel guide 34 attached on the ends and is positioned on the second end of the housing 20 as shown in FIG. 1. The disk 30 contains a stepped shoulder that allows interface with the second end of the housing 20 and a centrally located hole 36 receives the expansion sleeve rod end 26. Each channel guide 34 also contains a hole 38 in line with the threaded bosses 24 that act as clearance therebetween.

A pair of positioning bars 40 as shown in FIG. 2, having slots 42 therein are nested onto the guides 34 and connected to the threaded bosses 24 through the holes 38 with fastening means in the form of screws 44. These screws 44 may be of any type suitable for the purpose, as long as the head allows gripping with a conventional tool, such as a socket wrench or spanner. The bars 40 are adjusted to be parallel to the end of the housing 20 and provide positioning means to orient the tool at right angles to the clutch housing of the automatic transmission during the removal procedure. The ends of the bars 40 may be configured as shown in FIG. 2 or in a crescent shape (not shown) to allow additional contact surface upon the clutch housing.

Expansion release means is in the form of a compression spring 46 having an internal diameter slightly larger than the second end of the expansion sleeve 26 as shown in FIG. 4. The spring 46, in its compressed form, maintains sufficient pressure to separate the sleeve 26 from the housing 20 when tension is released from the belled end of the sleeve 26 upon the housing 20.

This action taken place when the tool is to be released from the transmission and is regulated by manual sleeve compressing means 48. This compressing structure has a handle portion and a threaded portion in the center of the handle. The handle is in "U" shape, formed of either flat bar stock, as illustrated in FIGS. 1 and 4, or may be constructed of a tubular rod with equal ease. The threaded portion of the sleeve compressor 48 is threadably retained upon the sleeve 26 on the hollow rod end and interfaced with the yoke top disk 30. When the compressor 48 is rotated in one direction, pressure is brought to bare between the top disk 30 and the junction of the belled end of the sleeve 26 to the slotted end of the housing 20. This pressure forces the housing to expand increasing the outside diameter sufficiently to grasp the register on the transmission clutch housing for the actual removal of the part.

A threaded shaft 50 with a handle 52 as shown best in FIG. 4, engages the inside threads of the sleeve 26 and places pressure onto the end of the transmission output shaft against the gripping of the sleeve 20 on the clutch housing. This action pulls the clutch housing away from the shaft when the handle 52 is rotated.

Figure 13:
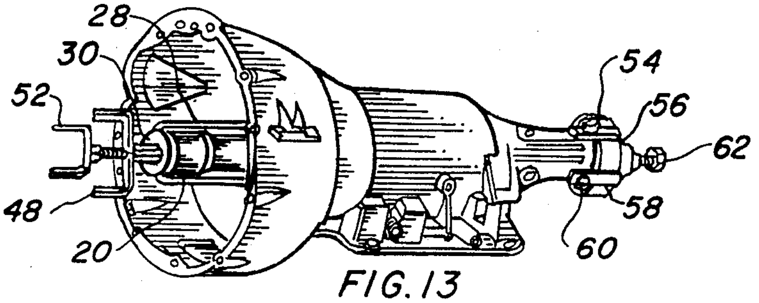
FIG. 13 is a partial isometric view of a partially dissembled automatic transmission with the tool set in place on both ends of the transmission case.

When servicing a GMC Turbo Hydramatic transmission series 200, the first assembly is used in combination with the second assembly to hold the transmission ouput shaft in a centered and rigid position during the removal procedure. The second assembly, as shown in FIGS. 8 through 12, employs a shaft retaining means 54, which compressibly retains the driven end of the output shaft protruding from the automatic transmission housing. This relationship is shown in FIG. 13. The tools separate components consist of a body 56 with a recessed threaded hole in the middle and a plurality of legs 58 distending at right angles downward from the periphery. Each leg 58 contains a threaded hole with attachment means in the form of a headed screw 60 therein allowing the retainer 54 to be attached to the transmission housing by tightening the screws creating an opposed force on the end of the housing. Compression means using a threaded shank screw 62 with a head on one end and a conical shaped point on the other is located in the recessed threaded hole in the body 56. When rotated, this screw 62 contacts a dimple in the end of the transmission output shaft centering the shaft and holding it securely in place.

The operation of the tool set is explained with reference to the removal or replacement of a clutch housing from a series 200 transmission. In this case, the transmission is removed from the vehicle placed on a work bench and dissembled down to the bare case with the front carrier, sun gear, and driving shell removed, and only the clutch housing, steel plates, friction plates, roller assembly and carrier assembly still retained on the output shaft. The shaft retainer 54 on the second assembly is attached to the output end of the housing, as illustrated in FIG. 13 by tightening all of the screws 60.

The first assembly is then inserted on the drive end with the housing 20 sliding into the internal register of the clutch housing as in FIG. 13. The housing 20 is expanded onto the register by tightening the sleeve compressor 48 until a tight fit is achieved. The positioning bars 40 are then adjusted with the screws 44 to mate with the flat surface of the clutch housing, maintaining the tool at exact right angles to the housing and parallel to the shaft. The shaft handle 52 is then rotated, applying pressure to the end of the shaft which then allows the entire clutch housing to be dislodged from the transmission case.

While the invention has been described in complete detail and pictorially shown in the accompanying drawings, it is not to be limited to such details, since many changes and modifications may be in the invention without departing from the spirit and the scope thereof. Hence, it is described to cover any and all modifications and forms which may come within the language and scope of the appended claims.

I claim:

1. A transmission clutch housing removal tool for dislodging and removing a clutch housing from an automatic transmission case where said tool comprises:

(a) a tubular housing having a first and second end larger than the middle portion thereof having a plurality of slots within the first end, and a pair of opposed bosses near the first end, each having a threaded cavity therein;

(b) an expansion sleeve disposed within said housing having a first end belled outward to a diameter slightly larger than that of said housing and a second end reduced in diameter forming a hollow rod with both the inside and outside threaded;

(c) a bifurcated yoke having a top disk and a pair of downwardly extending legs each having channel guides on the ends thereof, the top disk having a stepped shoulder insertably connected to the second end of said housing also having a hole receiving the expansion sleeve rod in a slideable manner;

(d) a pair of positioning bars having slots therein juxtapositioned on said guides and fastening means, threadably connected through said slots and said guides into said bosses in the housing providing positioning means to orient the tool at right angles to the transmission components affording a rigid interface thereupon;

(e) expansion release means retainably positioned between said expansion sleeve second end and said yoke top disk in such a manner as to continually urge a separation thereof, forcing the belled end of the sleeve away from the first end of the housing;

(f) manual sleeve compressing means having an internal threaded portion and a handle portion threadably retained on the sleeve hollow rod and interfacing with said yoke top disk, forcing the belled end of the sleeve into the slotted end of the housing increasing the outside diameter sufficiently to grasp a register on a specific transmission component when rotated thereagainst; and, (g) a threaded shaft, having a handle, engaging the inside threads of said sleeve allowing removal of a specific transmission component when said housing is compressibly grasped thereupon by urging the component from the transmission shaft by rotation of the handle of the threaded shaft.

2. A transmission clutch housing removal tool set for dislodging and removing a clutch housing from an automatic transmission case where said tool set comprises:

(a) a tubular housing having a first and second end larger than the middle portion thereof having a plurality of slots within the first end, and a pair of opposed bosses near the first end, each having a threaded cavity therein;

(b) an expansion sleeve disposed within said housing having a first end belled outward to a diameter slightly larger than that of said housing and a second end reduced in diameter forming a hollow rod with both the inside and outside threaded;

(c) a bifurcated yoke having a top disk and a pair of downwardly extending legs each having channel guides on the ends thereof, the top disk having a stepped shoulder insertably connected to the second end of said housing also having a hole receiving the expansion sleeve rod in a slideable manner;

(d) a pair of positioning bars having slots therein juxtapositioned on said guides and fastening means, threadably connected through said slots and said guides into said bosses in the housing providing positioning means to orient the tool at right angles to the transmission components affording a rigid interface thereupon;

(e) expansion release means retainably positioned between said expansion sleeve second end and said yoke top disk in such a manner as to continually urge a separation thereof, forcing the belled end of the sleeve away from the first end of the housing;

(f) manual sleeve compressing means having an internal threaded portion and a handle portion threadably retained on the sleeve hollow rod and interfacing with said yoke top disk, forcing the belled end of the sleeve into the slotted end of the housing increasing the outside diameter sufficiently to grasp a register on a specific transmission component when rotated thereagainst;

(g) a threaded shaft, having a handle, engaging the inside threads of said sleeve allowing removal of a specific transmission component when said housing is compressibly grasped thereupon by urging the component from the transmission shaft by rotation of the handle of the threaded shaft and, (h) a transmission output shaft holding means compressibly retained upon the outside of the transmission and interfacing with the transmission output shaft holding same in a centered and rigid position to allow said clutch housing to be removed from the opposite end of the transmission case.

3. The invention as recited in claims 1 or 2 wherein the fastening means to hold said positioning bars within said guides onto said housing bosses further comprise a pair of screws having a head suitable for gripping with a tool.

4. The invention as recited in claims 1 or 2 wherein said expansion release means further comprise a compression spring having an internal diameter slightly larger than the second end of the expansion sleeve configured such that sufficient pressure is maintained to separate the sleeve from the housing when tension is released from the belled end of the sleeve upon the first end of the housing.

5. The invention as recited in claim 2 wherein said transmission output shaft holding means further comprises:

(a) a body having a recessed threaded hole in the central portion thereof;

(b) a plurality of legs attached to the body distending downward from the periphery thereof, each leg having a theaded hole therein at right angles to the body;

(c) attaching means joined to said legs so as to grasp the automatic transmission and hold the shaft forcing means thereupon in a rigid manner; and, (d) compression means applying pressure to the transmission shaft in the center thereof while holding the outside of the transmission in a secure manner.

6. The invention as recited in claim 5 wherein said attaching means further comprise a plurality of screws having a head suitable for gripping with a tool.

7. The invention as recited in claim 5 wherein said compression means further comprise a headed screw with a threaded shank and a conical shaped point on the end thereof.

* * * * *